March 15, 1949.   E. R. GILMORE   2,464,499
SLIDING RECIPROCATING VALVE FOR
EXPANSIBLE CHAMBER METERS
Filed Aug. 24, 1944   3 Sheets-Sheet 3
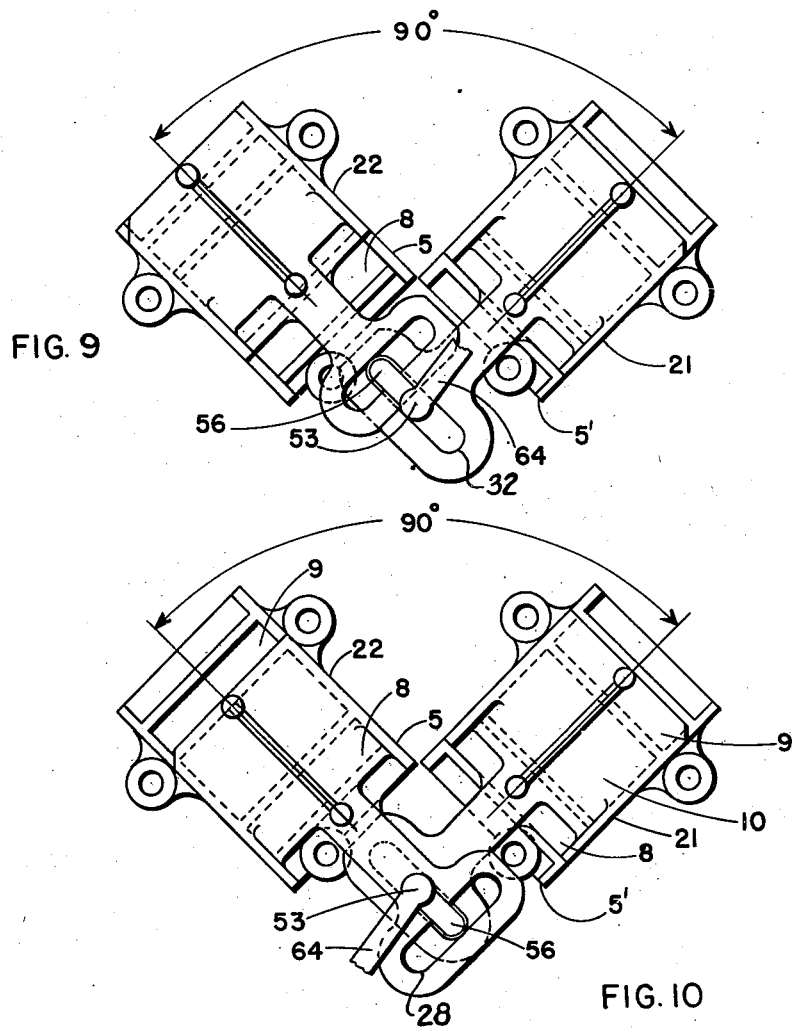
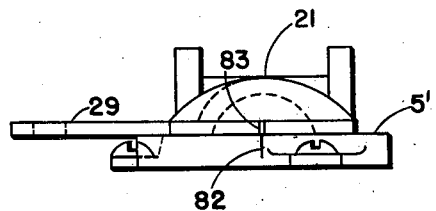
INVENTOR.
EDWARD R. GILMORE
BY *Strauch & Hoffman*
ATTORNEYS Patented Mar. 15, 1949

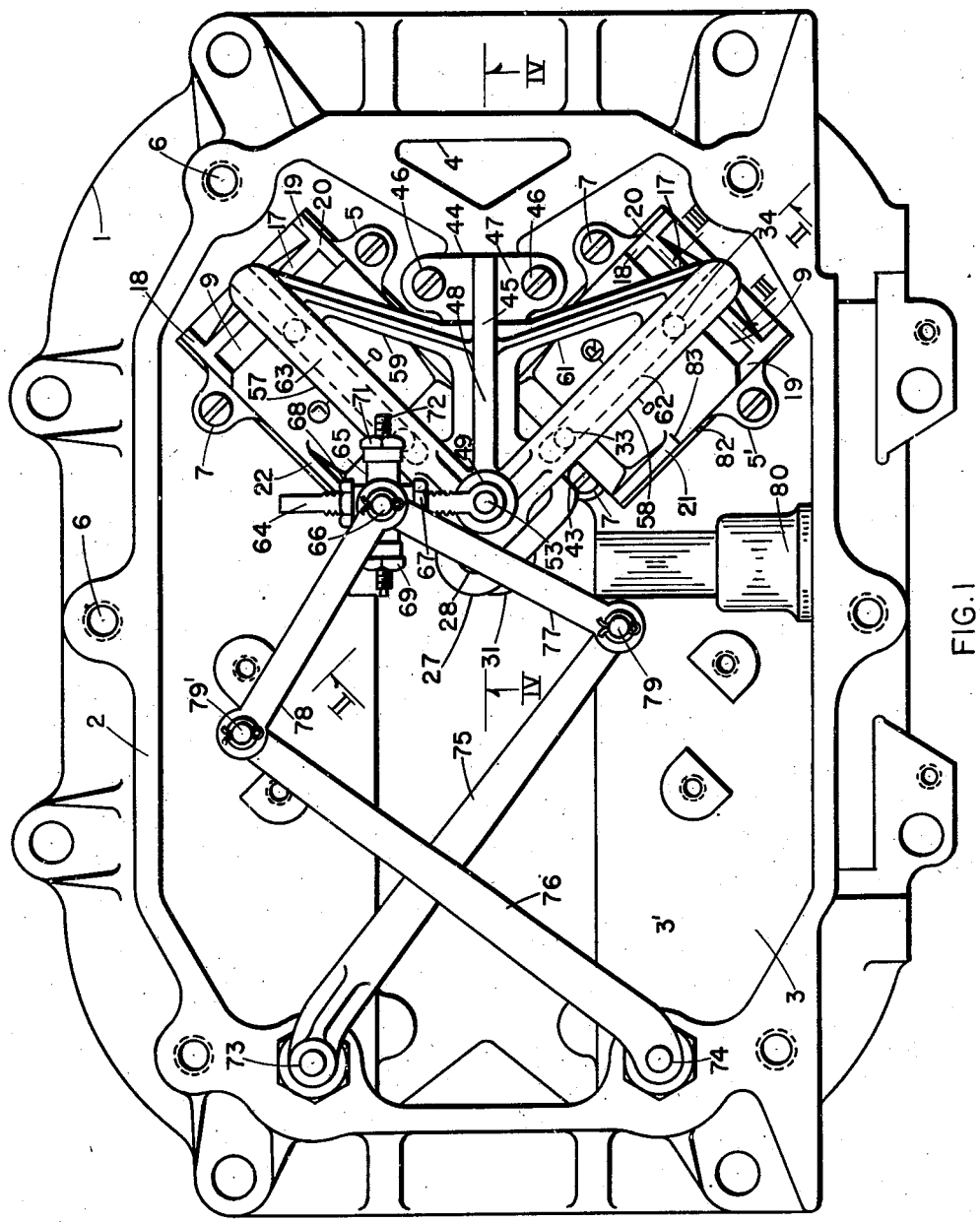

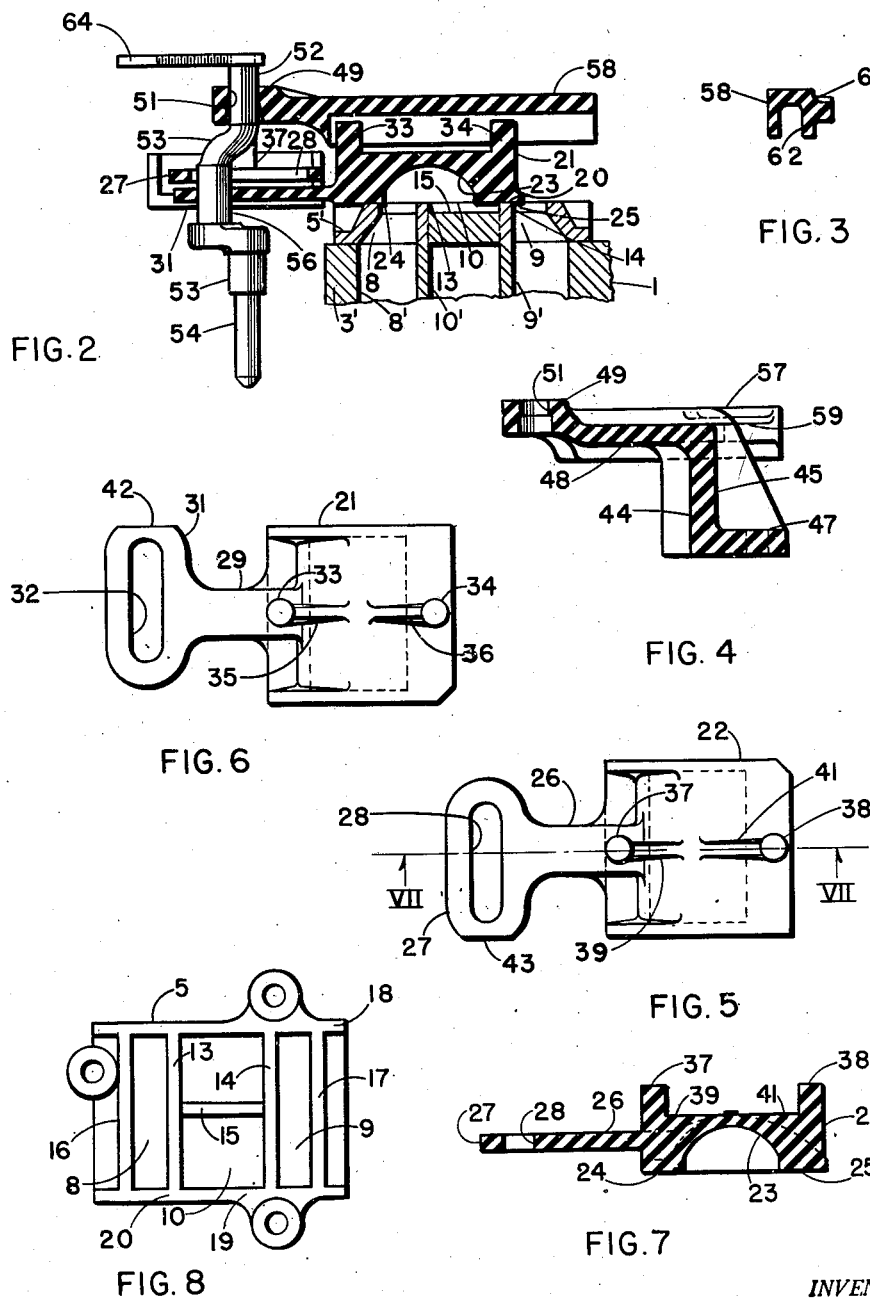

2,464,499

UNITED STATES PATENT OFFICE 2,464,499

SLIDING RECIPROCATING VALVE FOR EXPANSIBLE CHAMBER METERS

Edward R. Gilmore, Pittsburgh, Pa., assignor to Rockwell Manufacturing Company, a corporation of Pennsylvania Application August 24, 1944, Serial No. 550,991

5 Claims. (Cl. 121—188)

This invention and discovery relates to fluid flow meters and is particularly concerned with valve mechanism therefor.

The invention in its preferred embodiment will be described as employed with a gas meter of the type disclosed in United States Letters Patent to Armstrong No. 1,862,451, wherein a pair of bellows devices disposed to respond to the flow of gas through separate measuring chambers actuates flag rod mechanism connected by suitable linkages to valves adapted to control the inlet and outlet ports for those measuring chambers. The present invention and discovery is directed mainly to improvements in valve mechanism and associated valve port structure which may be employed with any flag rod and like actuating mechanism for example. The present invention greatly simplifies known valve mechanism of this type by eliminating a number of parts heretofore considered necessary, and simplifying many of the remaining parts.

With the above in mind, it is a major object of the present invention to provide novel gas or like meter valve construction and drive arrangements having a minimum of parts of optimum simplicity.

A further object of the invention is to provide a novel fluid flow meter valve integrally made of Bakelite or similar hard, light weight, moldable material which is resistant to moisture and temperature changes and retains its shape with substantially no structural deformation during normal operation, such as is present in the white metal normally used for such parts, and at the same time provides improved bearing contact surfaces for the rotating and sliding metal valve port and valve driving parts.

A further object of the invention is to provide a fluid flow meter valve mechanism wherein certain of the valve guide and drive parts are associated with a novel frame member made of Bakelite or some similar molded material which is inexpensive and light weight but resistant to structural deformation and has improved bearing characteristics which increase the life of the associated parts substantially.

A further object of the invention is to provide a novel fluid flow meter valve drive mechanism wherein a slidable valve is reciprocated by driving mechanism which delivers drive thrusts substantially in the plane of reciprocation of the valve slide support faces so as to provide a balanced drive arrangement which does not tend to tip the valve during normal operation.

A further object of the invention is to provide a novel fluid flow meter valve and associated drive mechanism wherein the valve uniformly travels the same distance in opposite directions and with equal accelerations from a central position during normal operation and wherein the valve can be readily preset in that central position in predetermined relation to the drive mechanism, whereby accurate calibration and timing of the valve is efficiently and readily accomplished. Pursuant to this object, a pair of valves is so driven and relatively calibrated.

A further object of the invention is to provide a novel fluid flow meter valve mechanism wherein a pair of angularly disposed valves is driven through a tangent arm connection from a fluid actuated meter part and wherein adjustment of the tangent arm affects both valves equally.

A further object of the invention is to provide a fluid flow meter reciprocating valve having novel protected guide arrangements.

Further objects of the invention will presently appear as the description proceeds in connection with the appended claims and the annexed drawings wherein:

Figure 1 is a top plan view of a valve chamber defining member with the top removed to illustrate the valve and valve operating mechanisms, according to a preferred embodiment of the invention;

Figure 2 is a section taken along line II—II of Figure 1 illustrating details of the valve construction, valve seat and guide arrangements, and the crank drive for the valve;

Figure 3 is a section taken along line III—III of Figure 1, illustrating the shape of the overhead protective guide for each valve in each arm of the overhanging frame member;

Figure 4 is a section taken substantially along line IV—IV of Figure 1, and illustrating the shape of the light-weight overhanging support bracket providing guides for the valves and an upper bearing for the crank arm driving the valves;

Figures 5 and 6 are top plan views of the two valves employed in the embodiment of the invention illustrated in Figure 1, and which are preferably integral units molded from Bakelite or like material;

Figure 7 is a section taken along line VII—VII of Figure 5 illustrating the preferred shape of each valve;

Figure 8 is a top plan view of a valve seat over which a valve of the invention is adapted to reciprocate and illustrating the shape and sizes of the ports;

Figures 9 and 10 are rather diagrammatic views in plan illustrating the relative positions of the valves, valve ports and tangent arm in two 180° displaced positions of the crank shaft driving the valves; and Figure 11 is a fragmentary side elevation of a valve and seat member assembly illustrating the centering index markings.

Referring now to Figure 1, numeral 1 designates the upper section of a sectional gas meter housing with the top cover of section 1 removed to illustrate a valve chamber 3 therewithin.

The sectional meter housing and its contents below the valve chamber may be the same as that illustrated in said Armstrong Patent No. 1,862,451; and since details of the housing sections and the bellows and measuring chambers therewithin are not part of the present invention, further description thereof beyond reference to said Armstrong patent as an example of such construction is not deemed necessary to understand the present invention.

A gas tight cover, not shown, but provided with an inlet port communicating with chamber 3 and an outlet port communicating with an exhaust conduit 4 in the side wall of chamber 3, is adapted to seat on the horizontal upper flanged face 2 of housing section 1. The cover is secured to the housing as by bolts extending into threaded apertures 6 in housing section 1.

The bottom wall 3' of chamber 3, as illustrated in Figure 2, is formed with suitable sets of openings 8', 9' and 10' registered with the rectangular ports 8, 9 and 10 respectively of each of a pair of angularly arranged valve seat members 5 and 5' affixed to bottom wall 3' as by screws 7.

As is illustrated best in Figures 2 and 8, each of these valve seat members 5 and 5', which are preferably identical and made of light metal, is formed with substantially rectangular inlet ports 8 and 9 at opposite sides of a larger rectangular outlet port 10. The inner walls of each outlet port 10 are defined by narrow lateral ribs 13 and 14 which are medially connected by a narrow longitudinal central web 15 for structurally strengthening the valve seat member. Each valve seat member is formed with upstanding narrow end ribs 16 and 17 and narrow longitudinal side ribs 18 and 19. The upper surfaces of ribs 13, 14, 16, 17, 18 and 19 are machined to lie in a common plane designated at 20, web 15 being cut off below that plane as illustrated in Figure 2 so that a continuous outlet port is provided. The area of each outlet port 10 is preferably equal to the sum of the areas of inlet ports 8 and 9.

Each planar surface 20 continuously surrounds both the inlet and outlet ports of its associated valve seat member, and serves as a supporting surface over and upon which the associated slide valve is adapted to reciprocate. When valve seat members 5 and 5' are secured to wall 3', valve support surfaces 20 thereof lie in a common plane.

Openings 8' and 9' communicate with the bellows occupied measuring chambers in the housing below valve chamber 3, while opening 10' communicates with exhaust conduit 4, by suitable further passages (not shown) as in the above mentioned Armstrong patent. Further description of these passages is not necessary to understand the present invention.

Valve seat members 5 and 5' of the usual white metal are disposed at an angle of 90° to each other in chamber 3. A pair of suitable light weight slide valves 21 and 22 is mounted on valve seat members 5 and 5' for reciprocation in directions at right angles to each other. Each valve preferably comprises an integrally molded member made of Bakelite or a similar normally hard readily molded material resistant to moisture and temperature changes. Each valve is a light weight but hard member which retains its shape with substantially no structural deformation during normal operation and provides a D-type valve having a central recess 23 and spaced flat co-planar valve seat surfaces 24 and 25 adapted to rest upon and slide over the planar upper surfaces 20 of valve seat members 5 and 5'.

As illustrated in Figures 5 and 7, valve 22 is formed with an integral projecting arm 26 having an enlarged closed yoke 27 at its end formed with a slot 28 which extends perpendicular to the direction in which valve 22 is designed to reciprocate during normal operation. Valve 21 is similarly formed with a rearwardly extending integral arm 29 terminating in a closed yoke 31 also provided with a longitudinal slot 32 extending at right angles to slot 28 and to the direction in which valve 21 is designed to reciprocate during normal operation. Valves 21 and 22 are substantially identical in the above respects except that arm 26 of valve 22 is disposed in a plane higher than arm 29 of valve 21 for a purpose which will appear.

Valve 21 is integrally formed with longitudinally aligned and transversely centered upstanding guide posts 33 and 34 having reinforcing webs 35 and 36. Similarly valve 22 is formed with longitudinally aligned and transversely centered upstanding guide posts 37 and 38 reenforced by webs 39 and 41. Yoke portions 27 and 31 of the respective valves are also formed with cut-away regions designated at 42 and 43 for a purpose which will appear.

As illustrated in Figures 1 and 2, each valve rests upon a planar valve seat surface 20. Valves 21 and 22, although very light, have such proportion and weight distribution through proper design in accord with the invention that they are self-balanced on surfaces 20 which carry their entire weight, and the weight of arms 26 and 29 is not sufficient to introduce any tendency to unbalance or tip the valves relative to their seats.

Furthermore, horizontal arms 26 and 29 which are connected to reciprocating mechanism to be described are disposed as closely as practically possible to the plane of seat surfaces 20 so that horizontal drive thrusts imparted thereto do not introduce force components tending to unbalance the valves on the seats and so that pure reiprocation of the valve is accomplished.

Intermediate valve seats 5 and 5', a crank arm bearing and valve guide bracket 44, made of Bakelite or like molded material, having an upstanding central vertical rib 45, is secured to wall 3' of chamber 3 as by screws 46 passing through a flanged base 47. Rib 45 has a horizontal portion 48 formed at its end with an apertured boss 49 providing a Bakelite or like journal 51 for the cylindrical upper end 52 of a crank shaft 53. Crank shaft 53 which is made of bronze or like material usually used has its lower portion 54 journalled in suitable radial and thrust bearings (not shown) provided in the housing 1 in vertical alignment with journal 51. Just below journal 51, crank shaft 53 is formed with an offset vertical cylindrical crank pin 56.

It will be noted that the crank parts 52 and 56 rotate and also slide directly in and on Bakelite bearing surfaces and it has been found wear much better and last substantially longer than like parts which bear in white metal.

As illustrated in Figures 1 and 4, bracket 44 is integrally formed with wings 57 and 58 diverging from boss 49. Wings 57 and 58 extend at right angles to each other, and arm 48 bisects the angle between them. Integral horizontal reenforcing webs 59 and 61 tie the top of vertical rib 45 to the ends of wings 57 and 58.

Referring now to Figures 2 and 3, wing 58 is formed on its under side with an elongated deep longitudinal recess 62 opening downwardly and at the outer end of wing 58. Wing 57 is similarly formed with a longitudinal open recess 63. Recesses 62 and 63 extend at right angles to each other, and each has vertical parallel side walls providing overhead guideways for receiving the upstanding guide posts on the valves. The width of each recess 62 and 63 is preferably slightly greater than the diameter of a guide post on the valve to prevent binding during reciprocation, and the provision of spaced cylindrical guide posts engaging each flat-sided guideway provides a construction preventing lateral rocking or displacement of the valves while maintaining a minimum area of actual guide surface engagement, the guide posts having only line contact with the vertical guideways. The guide posts do not contact the bottoms of recesses 62 and 63. Wings 57 and 58 thus provide overhead slide guideways which are protected against the deposit of dust and dirt in the ways, a factor which contributes to long life and satisfactory performance in the invention.

As illustrated in Figures 1 and 2, crank pin 56 passes through valve arm slots 28 and 32 and the diameter of crank pin 56 is only slightly less than the width of slots 28 and 32, so that there is little or no play. As further illustrated in Figure 2, the bodies of valves 21 and 22 are wholly supported on surfaces 20 of valve seat members 5 and 5' so that rigid arms 26 and 29 and bosses 27 and 31 are disposed in slightly vertically spaced relation and normally do not contact each other during reciprocation, thus avoiding interference and frictional loss. Furthermore, the planes of engagement of crank pin 56 with both valves 21 and 22 are closely adjacent the plane of surfaces 20 on which the valves slide, thereby insuring that the horizontal drive thrusts exerted by eccentric crank pin 56 will be delivered in substantially the plane of reciprocation of the valve seats and there will be no tendency for the valves to become tipped or overturned by the drive mechanism during reciprocation. It will also be noted that the axis of the crank 56 is spaced from the adjacent end of the seat engaging surfaces of the valves at a distance which is appreciably less than the length of the valves. As the relatively short arms 26 and 29 are integral parts of the valve, they provide substantially rigid connections with the crank pin which will not be vertically deflected or bent in the rotation of the crank pin and impart an angular thrust force to the valve which would tend to vertically rock or tip the valves on their respective seats.

The upper end 52 of crank shaft 53 above boss 49 is non-rotatably secured to one end of a threaded horizontal tangent rod 64. Rod 64 has upper and lower flat sides providing guides for slideably supporting a longitudinally adjustable member 65 having a rigid upstanding cylindrical pin 66. Nuts 67 and 68 threaded on rod 64 determine and maintain the desired longitudinal spacing between the axes of shaft 53 and pin 66. Member 65 is suitably slotted so as to be slidably adjustable in either direction at right angles to the axis of pin 66, this adjustment being present and maintained by nuts 69 and 71 and a cross guide shaft 72 passing through member 65. Specific details of a tangent adjustment of this nature are disclosed in Armstrong Patent No. 1,723,-397, and further description thereof is not here needed to understand the invention, as it will be understood that any equivalent tangent adjustment may be provided.

The upper ends of oscillatable flag rods 73 and 74 extending through gastight bushings into chamber 3 have non-rotatably secured thereto the ends of horizontal levers 75 and 76 disposed at slightly different levels to cross without contact as illustrated. Horizontal links 77 and 78 have their opposite ends freely pivotally connected at 79 and 79' to levers 75, 76 and to pin 66, so that oscillation of either or both flag rods actuates the valve mechanism crank shaft 53.

A register (not shown) is driven from the lower end of crank shaft 53 by a suitable cross drive shaft extending through boss 80.

In operation, flag rods 73 and 74 are oscillated by actuation of the bellows in the measuring chambers below chamber 3, and this oscillation is converted by linkage 75, 77 and 76, 78 to rotation of crank shaft 53 through tangent arm 64. Crank pin 56 is thereby continuously moved in a circular path about the vertical axis of shaft 53 so as to actuate the register and also cause controlled reciprocation of valves 21 and 22. The length of slots 28 and 32 is equal to slightly more than twice the eccentricity of pin 56 from shaft 53.

As valves 21 and 22 reciprocate, inlet ports 8 and 9 are successively opened to chamber 3 and connected through recess 23 to outlet ports 10 so that a flow of gas to and from the measuring chambers is effectively controlled by valves 21 and 22.

As diagrammatically illustrated in Figures 9 and 10, valve 21 may be centrally located on valve seat member 5' so that both inlet ports 8 and 9 are closed by valve faces 24 and 25. This central valve position may be identified by suitable index or fiducial marks on valve 21 and seat member 5', as at 83 and 82 in Figure 11. With valve 21 set in this indicated central position, crank shaft 53 is in such position of rotation that the plane containing the axes of shaft 53 and crank pin 56 is disposed at right angles to the path of reciprocation of valve 21. This is true regardless of which of the two 180° spaced positions of crank pin 56 fulfilling this requirement is selected.

The markings 82 and 83 are used in the assembly of the parts for the purpose of accurately locating the valves on their seats in the proper position of crank pin 56 and centering the top bearing for shaft 53 in the bracket 44 directly over the bottom shaft bearing. This top bearing is supported in the bracket with sufficient clearance so that the bracket may then be adjusted to proper position for fastening by the screws 46. In prior constructions using metal brackets, it was the practice to bend the bracket after it had been fastened to properly position the shaft bearing. In the present construction, in which the bracket and valves are formed from light weight plastic material, greater tolerances may be utilized and dowel pins or fixtures are not necessary in assembling and accurately locating the valves and bracket, thus realizing an appreciable reduction in manufacturing cost.

When shaft 53 rotates, crank pin 56 eccentric thereto causes reciprocation of valve 21, to uncover ports 8 and 9 in succession, and this reciprocation is with equal accelerations and over equal distances from the indicated central position. This is a decided improvement over prior link operated valve mechanisms wherein different stroke lengths and accelerations were encountered and rendered calibration and timing difficult. When crank pin 56 is at its nearest position to valve seat member 5' so that valve 22 is centered on seat 5, port 8 of seat 5' is wide open to chamber 3 and port 9 is connected to outlet port 10 through valve recess 23. Similarly, when crank 56 is most remote from valve seat member 5', 180° displaced from the above location, valve 22 is again centered on seat 5, and port 9 of seat 5' is wide open to chamber 3 and port 8 is connected to outlet port 10 approximately as shown in Figure 2. Figures 9 and 10 diagrammatically illustrate corresponding position of valve 22 as similarly driven in 180° displaced position of crank pin 56.

Valve 22 and valve seat member 5 may be similarly provided with indicia for centrally positioning valve 22 on seat 5 when the plane containing the axes of shaft 53 and crank pin 56 is at right angles to the plane of reciprocation of valve 22. Similarly, all the other positions of valve 22 are positively related to the angular position of crank pin 56 as with valve 21.

Correlation and exact timing between the valves are rendered accurate by the above construction since when crank pin 56 is positioned to locate either valve 21 or 22 centrally, at the same time the other valve is positioned with either port 8 or port 9 wide open, depending upon the particular 180° angular position of shaft 53. For example, when valve 21 is centrally positioned with crank pin 56 disposed at its most remote position from valve seat member 5, as in Figure 10, valve 22 is positioned at the inner end of its stroke to completely uncover port 9 and to connect port 8 to port 10. When crank pin 56 is displaced 180° as in Figure 9, valve 21 is again centrally located but valve 22 now completely uncovers port 8 and connects port 9 to port 10. This same relation is maintained between the valves during operation by reason of the positive drive arrangement of the invention.

Thus both, or either, of valves 21 and 22 may be preset in predetermined position relative to a correlated position of the drive mechanism therefor, and both valves are in the above manner permanently preset for synchronous cooperation. This relative location of valves and crank pin may be accurately established by proper dimensioning of the parts, and once assembled is not subject to change. In practice it is necessary to provide index marks on one valve only because the positive relation of the parts insures proper correlation thereof once that valve is set.

The above described construction provides a direct positive drive between crank shaft 53 and valves 21 and 22. Thus tangent arm 64 directly drives the rigid valve arms through crank pin and slot connection which dispenses with valve arm angularities heretofore employed in earlier drives.

The adjustments on the tangent arm equally affect both valves. Adjustment of pins 66 longitudinally of arm 64 effectively determines the tangent arm length, while adjustment of pin 66 transversely of arm 64 is a control of the lead or relative timing of the valves. Both of these adjustments are preset and locked at the factory, but are available for recalibration when the cover is removed.

I have discovered that the use of a guide bracket 44 made of a moldable plastic, such as a phenol condensation product, is unexpectedly advantageous in the meter construction as it is structurally more resistant to deformation and provides a much better bearing material at journal 51 and pin 56 for the bronze crank shaft than the previously used white metal bracket and valve, as well as being resistant to moisture and temperature changes and of low cost.

In the illustrated embodiments, slots 28 and 32 are each unsymmetrical with relation to the longitudinal center line of the associated valve, but this is due to the fact that the axis of shaft 53 happens to be slightly displaced from the point of intersection of the longitudinal center line of guideways 62 and 63. For the same reasons, the valve yokes are cut away at 42 and 43 to avoid collision during operation. This arrangement conserves space and enables a narrower meter cover to be used. However, the axis of shaft 53 may be made to coincide with that guideway intersection point, in which case the valve slots will be symmetrical.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter valve assembly, a pair of valves mounted for reciprocation in angularly related paths, means for slidably guiding said valves on their respective seats, each valve having a rigid arm projecting from one end in closely adjacent parallel relation to the seat engaging surface thereof, said valve arms being each disposed in a single plane with said planes adjacently spaced in parallel relation to each other, each of said arms having a single closed slot therein normal to the direction of reciprocation of the valve, and a meter driven shaft having a single crank portion movable in said slots and coacting with said valve arms to simultaneously and equally reciprocate the valves upon their respective seats.

2. A fluid flow meter valve comprising a body having a flat bottom seat engaging surface, rigid guide means upstanding from the body, and an arm integral with said body closely adjacent to said seat engaging surface, said arm being formed with a transverse slot substantially normal to said guide means.

3. In a fluid meter valve assembly, a valve mounted for longitudinal reciprocation on a valve seat, said valve having an arm projecting longitudinally from one end of the valve and rigidly united therewith closely adjacent to the seat engaging surface of the valve, and said arm being provided with a bearing for direct connection with a meter driven member rotatable about a fixed axis spaced from said end of the valve for a distance appreciably less than the length of the valve, whereby reciprocatory thrust forces of said member are transmitted to the valve through said arm substantially entirely in a plane parallel to the seat engaging surface of the valve.

4. In a fluid meter valve assembly, a pair of valves mounted for reciprocation in angularly related paths, a fixed bracket having angularly disposed parts positioned about and out of vertical pressure contact with the respective valves, said bracket parts and valves having coacting means slidably guiding the reciprocatory motion of the valves on their respective seats, and a meter driven crank operatively connected with a part integral with each valve closely adjacent to their respective seat engaging surfaces and movable about an axis spaced from adjacent ends of the seat engaging surfaces of the valves for a distance substantially less than the length of the valves to impart horizontal reciprocating thrust forces thereto substantially without component vertical forces tending to tip the valves on their seats relative to said fixed bracket.

5. In a fluid meter valve assembly, a pair of valves mounted upon respective valve seats for reciprocation in angularly related paths, a relatively fixed bracket above said valves, said valves and bracket having coacting parts guiding the reciprocating movement of the valves, a meter driven shaft having a crank portion operatively connected with said valves, said bracket having a bearing for the upper end of said shaft, and means for establishing an assembled relation of the valves and bracket with respect to the valve seats with said shaft bearing on the bracket in accurately centered relation to a bearing for the lower end of said shaft.

EDWARD R. GILMORE.

REFERENCES CITED

The following references are of record in the file of this patent:

UNITED STATES PATENTS

| Number | Name | Date |
| --- | --- | --- |
| 299,161 | Peppard | May 27, 1884 |
| 555,786 | Mitchel et al. | Mar. 3, 1896 |
| 722,389 | Sprague | Mar. 10, 1903 |
| 991,927 | Armstrong | May 9, 1911 |
| 1,647,598 | Wilson | Nov. 1, 1927 |
| 1,804,596 | Dickinson | May 12, 1931 |
| 2,346,229 | Ormerod et al. | Apr. 11, 1944 |

FOREIGN PATENTS

| Number | Country | Date |
| --- | --- | --- |
| 546,659 | Great Britain | July 23, 1942 |
| 547,252 | Great Britain | Aug. 20, 1942 |
| 412,719 | Germany | Apr. 27, 1925 |